Aug. 19, 1952   R. G. SHEIDLER   2,607,873
INDICATOR FOR ELECTRIC COOKING RANGES
Filed Feb. 27, 1950   3 Sheets-Sheet 1
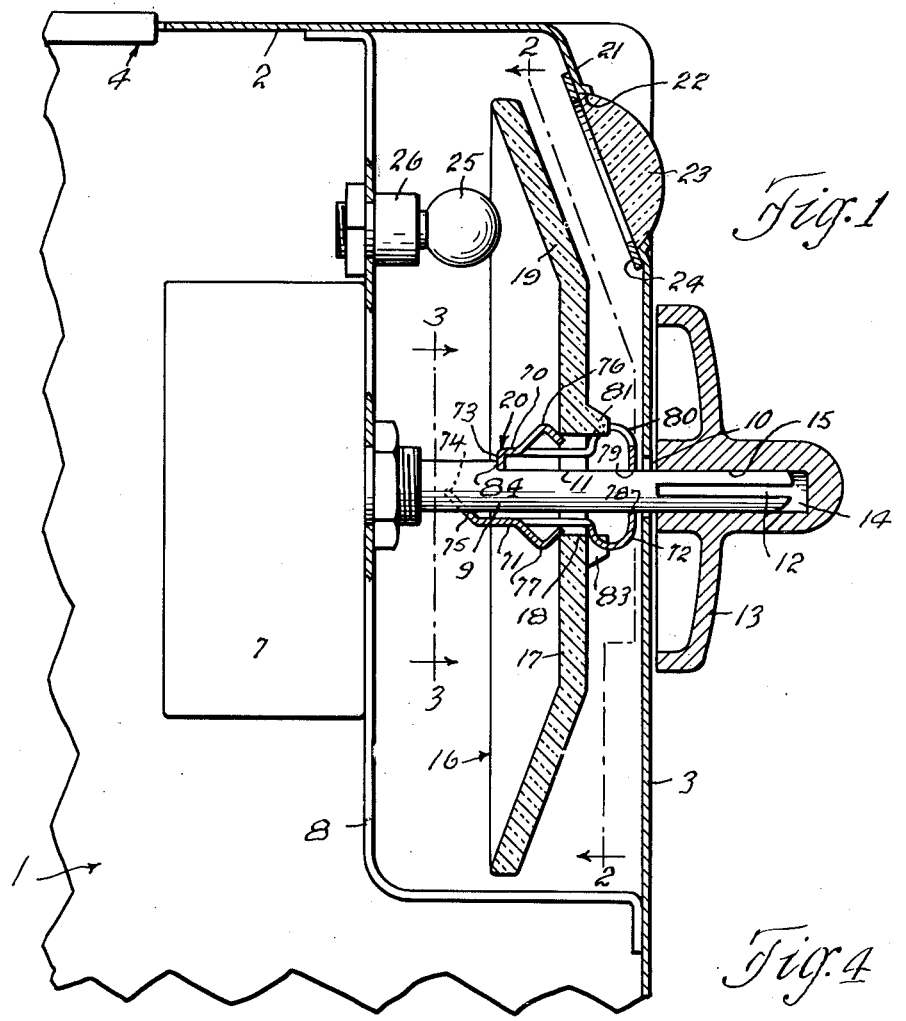
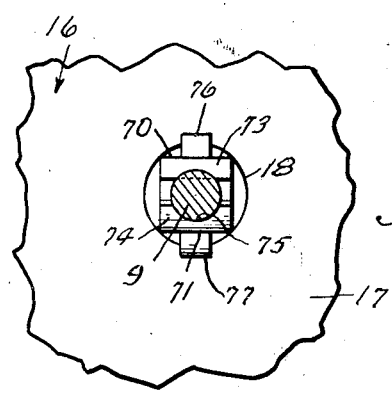
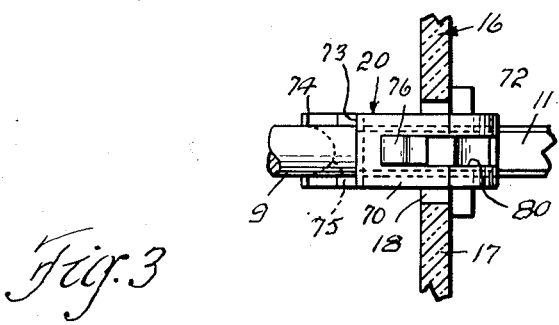
INVENTOR.
Robert G. Sheidler
BY Chas. H. Trotter
Atty.

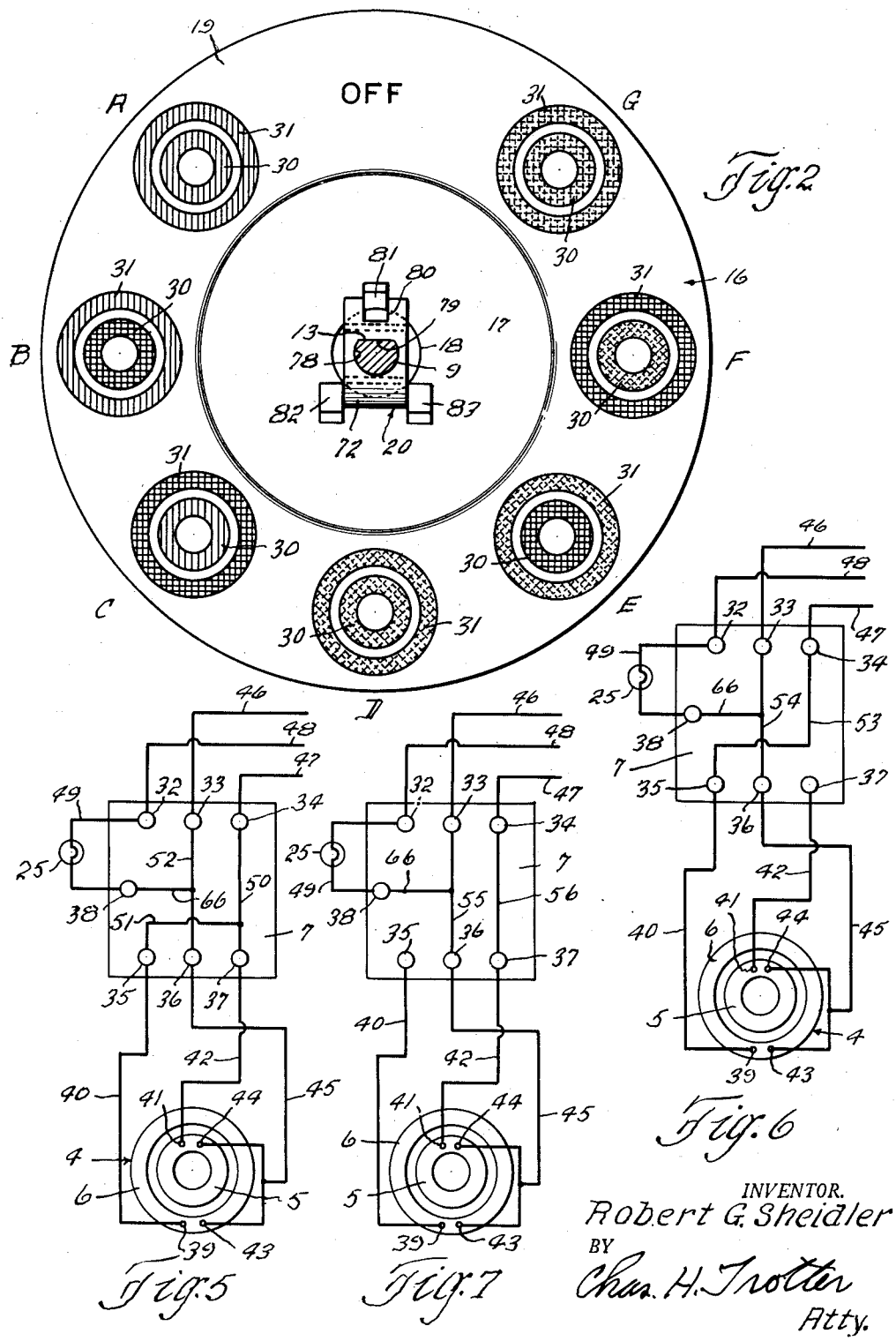

Aug. 19, 1952  R. G. SHEIDLER  2,607,873
INDICATOR FOR ELECTRIC COOKING RANGES
Filed Feb. 27, 1950  3 Sheets-Sheet 3
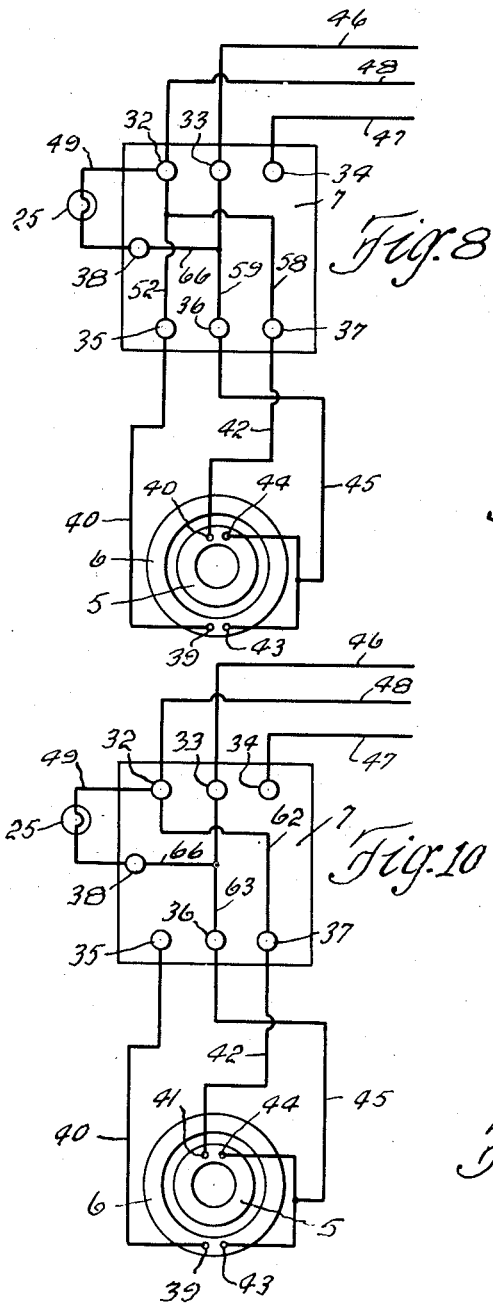
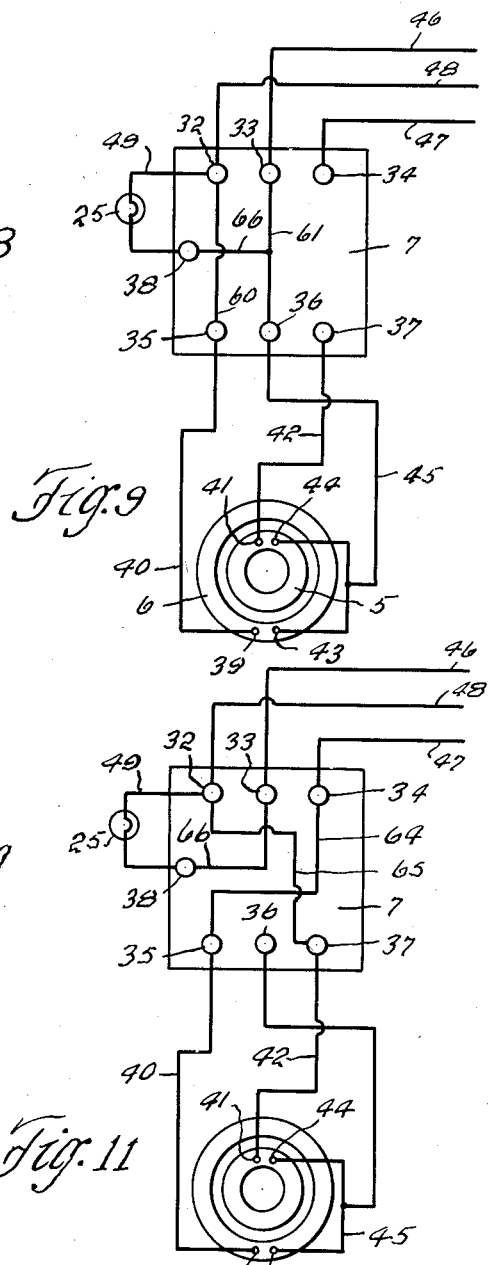
INVENTOR.
Robert G. Sheidler
BY
Chas. H. Trotter
Atty.

Patented Aug. 19, 1952

2,607,873

UNITED STATES PATENT OFFICE 2,607,873

INDICATOR FOR ELECTRIC COOKING RANGES

Robert G. Sheidler, Mansfield, Ohio, assignor to The Tappan Stove Company, Mansfield, Ohio, a corporation of Ohio Application February 27, 1950, Serial No. 146,453

4 Claims. (Cl. 219—20)

This invention relates to indicators for electric cooking ranges by which one can tell at a glance the condition of an electric heating unit therein. The subject matter of the present application is related to that of my copending application, Serial No. 163,756 filed May 23, 1950, and also to that of my copending application 153,654 filed April 3, 1950.

Standard electric heating units for cooking ranges generally comprise a pair of concentrically arranged resistance elements which are adapted to be energized either in conjunction with each other or independently of each other in varying degree in order to generate different amounts of heat. The energization of the resistance elements is controlled by a suitable switch.

The embodiment of my invention disclosed herein is shown and described in connection with a heating unit having two concentrically arranged standard resistance heating elements which are adapted to be connected by a standard switch to a three wire 220 volt transmission system. The switch is arranged to selectively supply current to the resistance elements at either 220 or 110 volts. The two elements may be simultaneously connected to the transmission system or either one alone may be connected thereto. For the purpose of illustration I have shown a heating unit having an outer heating element, which will produce 700 watts at 220 volts, and an inner heating element which will produce 500 watts at 220 volts. At 110 volts the outer and inner elements will produce 175 and 125 watts, respectively. From this it follows that when the outer and inner elements are simultaneously energized in parallel at 220 volts the unit will produce 1200 watts; and when the elements are simultaneously energized at 110 volts in parallel the unit will produce 300 watts. When the outer element alone is energized the unit will produce 700 watts at 220 volts and 175 watts at 110 volts; and when the inner element alone is energized the unit will produce 500 watts at 220 volts and 125 watts at 110 volts. When the outer and inner elements are simultaneously energized in series at 110 volts the unit will produce 75 watts. From this it will be seen that the unit may be selectively set by the switch to produce either 1200 watts, 700 watts, 500 watts, 300 watts, 175 watts, 125 watts or 75 watts. Generally when cooking the heating unit is substantially covered by the cooking utensil. Consequently one cannot see the heating elements to tell how they are energized. Furthermore even when the elements are exposed to view it is not always possible to tell by looking at them just which element is energized and how it is energized especially at 110 volts. Therefore I provide a visual indicator by which one can tell at a glance the exact condition of a heating unit. For the most efficient and economical operation of a heating unit in an electric cooking range it is not only necessary for one to know whether a heating unit is generating high, medium or low etc. heat but it is also very essential that one know which element or elements of a two element heating unit is energized and to what degree. In cooking it is generally customary to first set a heating unit at its highest heat generating capacity to quickly heat food up to the proper cooking temperature and then set the unit for a lower heat which is just sufficient to maintain the food at the proper cooking temperature. For instance in boiling vegetables or other food the heating unit is first set for a high heat and as soon as the water commences to boil the unit is set for a lower heat which is just sufficient to keep the water boiling. But the highest heat generating capacity of the unit in many instances may not be the proper setting for efficiently and economically quickly raising food to cooking temperature. Using the two element heating unit described herein, in which the inner and outer elements together generate the highest heat, the outer element alone the second highest heat and the inner element alone the third highest heat, let us assume that one wants to boil food in a utensil which covers only the inner heating element. Under this condition the inner element alone should be energized for initially bringing the water to boiling temperature. If both elements were energized the heat from the outer element would be completely wasted, passing up around the outside of the utensil and heating only the handle thereof. If the outer element alone was energized practically all of the heat would be lost and none applied to the utensil and the contents thereof; whereas with the inner element alone all of the heat generated thereby would be applied to the utensil thereover without any loss. And there are many other occasions during cooking when it is essential for best results to know which element or elements is energized and to what degree, instead of merely knowing that a unit is set to generate high, medium or low etc. heat.

My improved indicator comprises a translucent disc which is mounted axially thereof on the operating stem of the control switch for rotation therewith. On this disc are eight equally spaced stations arranged in an annular row about the switch stem. These stations are adapted to be selectively brought up behind a window, which constitutes a fixed index, in the front wall of the cooking range by the rotation of the switch control stem as it is rotated to set the switch in position for the heating unit to produce the desired heat. At each station I have a design suitably applied to the disc which simulates the heating unit and the condition of the heating elements at the time any particular station is visible through the window. I provide an electric light bulb behind the disc in position to illuminate the design on the disc as the stations are selectively brought into position to be visible through the window. In the designs simulating the heating elements I use four different colors to indicate different conditions of the heating unit and the heating elements therein, preferably red, orange, yellow and black. Red indicates that 220 volts is applied in parallel to an element or elements; orange indicates that 110 volts is applied in parallel to an element or elements; yellow is used to indicate that 110 volts is applied in series to the two elements of the unit, and black indicates that an element is not energized. To illustrate the use of the indicator let us assume that the design visible through the window shows both elements red. This indicates that both elements are energized at 220 volts. If the design shows the outer element red and the inner element black it indicates that the outer element is energized at 220 volts and that the inner element is not energized. Likewise if the design shows the inner element orange and the outer element black it indicates that the inner element is energized at 110 volts and that the outer element is not energized.

The principal object of the invention is to provide a very simple, efficient, inexpensive and ornamental mechanism for visually indicating and controlling the heat generating condition of the inner and outer heating elements of a two element heating unit in a cooking range.

Another object of the invention is to provide an indicator of this character which is controlled by the operating stem of the heating unit control switch.

Another object of the invention is to provide an indicator of this character which comprises a disc having various designs thereon which simulate various different conditions of a two element heating unit.

Other and more limited objects of the invention will be apparent from the following specification and the accompanying drawings forming a part thereof wherein:

Fig. 1 is an enlarged fragmentary vertical section through a portion of an electric cooking range showing my improved indicator incorporated therein;

Fig. 2 is a section taken on the line 2—2 of Fig. 1;

Fig. 3 is a section taken on the line 3—3 of Fig. 1;

Fig. 4 is a fragmentary sectional plan view showing a portion of the indicator disc in section and the connector, by which the disc is removably mounted on the switch operating stem, in plan; and Figs. 5 to 11, inclusive, are wiring diagrams diagrammatically showing the various switching connections by which the heating unit is controlled.

Referring now to the drawings by reference characters, the numeral 1 indicates generally an electric cooking range having the top wall 2 and the front wall 3. An electric heating unit 4 having inner and outer concentric standard resistance heating elements 5 and 6 is suitably supported by the top 2 of the range. The energization of the heating elements 5 and 6 is controlled by a switch 7 by which the elements 5 and 6 are selectively connected to a three wire 220 volt transmission system. The switch 7 which is suitably secured to a bracket 8 within the range is a seven heat switch of standard well known construction. Consequently it is not illustrated in detail herein. The switch 7 has an operating stem 9 which extends out through an aperture 10 in the front wall 3 of the range. The stem 9 has a flattened portion 11 and has its outer end slotted as indicated at 12. An operating handle 13 having a bore 14 with a flattened portion 15 which engages the flattened portion 11 of the stem 9 is removably held by friction upon the outer end of the stem 9. By rotating the switch operating stem 9 by the handle 13 the switch 7 may be selectively set to energize the resistance elements 5 and 6 as desired.

In order that one may know the setting of the switch 7 and consequently the condition of the heating elements 5 and 6 of the heating unit 4, I provide visual indicating means which includes a disc 16 of translucent material. The disc 16 comprises a flat inner section 17, having a central aperture 18, and an outer annular rearwardly flaring section 19. The disc 16 is removably secured upon the switch operating stem 9 for rotation therewith behind the front wall 3 by a connector 20, to be described in detail hereinafter. In the front wall 3, above the operating handle 13, I provide a rearwardly sloping depressed section 21 having a window 22 therein which is in vertical alignment with the stem 9. A lens 23 is removably secured in the window 22 by a retaining ring 24. An electric bulb 25 is mounted in a socket 26 carried by the bracket 8 in position to project light through the annular flaring section 19 of the disc 16 and the window 22 and lens 23.

On the annular flaring section 19 of the disc 16 I provide an annular row of equally spaced stations which correspond to the different setting of the switch 7. There are eight of these stations, the "Off" station and seven operating stations, designated A, B, C, D, E, F and G, respectively, in a counterclockwise direction from the off station which is marked "Off." At each operating station I have applied a design which consists of two concentric rings 30 and 31 which simulate the inner and outer resistance elements 5 and 6 of the heating element 4. In order to simulate the condition of the resistance elements I have colored the rings at the various stations using a different arrangement of colors at each station. At station A I have colored both the inner and outer rings 30 and 31 red. At station B I have colored the outer ring 31 red and the inner ring 30 black. At station C I have colored the inner ring 30 red and the outer ring 31 black. At station D I have colored both the inner ring 30 and the outer ring 31 orange. At station E the outer ring 31 is colored orange and the inner ring 30 is colored black. At station F the inner ring 30 is colored orange and the outer ring 31 is colored black; and at station G both rings are colored yellow. As previously stated, I use the color red to indicate that a heating element is energized at 220 volts; the color orange to indicate that a heating element is energized at 110 volts, and the color yellow to indicate that both elements are energized in series at 110 volts.

As the operating stem 9 is rotated by the handle 13 to set the switch 7 to a selected position the corresponding station and design on the disc 16 are brought behind the window 22 in position to be viewed through the lens 23. The electric bulb 25, which is also controlled by the switch 7, will illuminate the design behind the window 22 and make it more clearly visible through the lens 23. The switching arrangement with which station A corresponds is shown in Fig. 5; that to which station B corresponds is shown in Fig. 6; that to which station C corresponds is shown in Fig. 7; that to which station D corresponds is shown in Fig. 8; that to which station E corresponds is shown in Fig. 9; that to which station F corresponds is shown in Fig. 10, and that to which station G corresponds is shown in Fig. 11.

Referring now to Figs. 5 to 11, inclusive, the switch 7 is shown as having seven terminals as indicated at 32, 33, 34, 35, 36, 37 and 38, respectively. The terminal 39 of the outer heating element 6 is connected to the terminal 35 of the switch 7 by the wire 40, and the terminal 41 of the inner heating element 5 is connected to the terminal 37 of the switch by a wire 42. The terminal 43 of the outer heating element 6 and the terminal 44 of the inner heating element 5 are each connected to the terminal 36 of the switch 7 by the wire 45. The three wires of a 220 volt three wire transmission system are indicated at 46, 47 and 48. Wires 46 and 47 together will supply current at 220 volts, and either of wires 46 or 47 with neutral with 48 will supply current at 110 volts. Transmission wire 46 is connected to the terminal 33 of the switch 7 and the wire 47 is connected to the terminal 34 of the switch 7. The neutral wire 48 is connected to the terminal 32 of the switch. The electric bulb 25 is connected to the terminals 32 and 38 of the switch 7 by the wire 49. Assuming that the outer heating element 6 will produce 700 watts at 220 volts and 175 watts at 110 volts and that the inner heating element 5 will produce 500 watts at 220 volts and 125 watts at 110, the heating unit 4 will produce 1200 watts when the switch 7 is set as shown in Fig. 5. At this setting the terminal 34 is connected to the terminals 37 and 35 by the lines 50 and 51, and the terminal 33 is connected to the terminal 36 by the line 52. Current will then flow from the wire 46 through line 52 and wire 45 to the terminal 44 of the inner element 5 and to the terminal 43 of the outer element 6. After passing through the inner element 5 the current will flow back to the wire 47 from the terminal 41 through the wire 42 and line 50; and after passing through the outer element 6 the current will flow back to the wire 47 from the terminal 39 through the wire 40 and lines 51 and 50. From this it will be seen that both of the elements 5 and 6 are energized in parallel at 220 volts.

Fig. 6 shows the switch 7 set to energize the outer element 6 only at 220 volts. In this setting the terminal 34 is connected to the terminal 35 by the line 53 and the terminal 33 is connected to the terminal 36 by the line 54. Current will then flow from the wire 46 through the line 54 and wire 45 to the terminal 43 of the outer element 6, and after passing through the element 6 the current will flow from the terminal 39 back to the wire 47 through the wire 40 and line 53.

Fig. 7 shows the switch 7 set to energize the inner element 5 only at 220 volts. In this setting the terminal 33 is connected to the terminal 36 by the line 55, and the terminal 34 is connected to the terminal 37 by the line 56. Current will then flow from the line 46 through the line 55 and wire 45 to the terminal 44 of the inner element 5, and after passing through the element 5 the current will flow from the terminal 41 back to the wire 47 through the wire 42 and line 56.

Fig. 8 shows the switch 7 set to energize the inner and outer elements 5 and 6 in parallel at 110 volts. In this setting the terminal 32 is connected to the terminals 35 and 37 by the lines 52 and 58, and the terminal 33 is connected to the terminal 36 by the line 59. Current will then flow from the wire 46 through the line 59 and wire 45 to the terminal 43 of the outer element 6 and to the terminal 44 of the inner element 5. After passing through the outer element 6 the current will flow from the terminal 39 back to the neutral wire 48 through the wire 40 and line 52; and after passing through the inner element 6 the current will flow from the terminal 41 back to the neutral wire 48 through the wire 42 and line 58.

Fig. 9 shows the switch 7 set to energize the outer element 6 at 110 volts. In this setting the terminal 32 is connected to the terminal 35 by the line 60, and the terminal 33 is connected to the terminal 36 by the line 61. Current will then flow from the wire 46 through the line 61 and wire 45 to the terminal 43 of the outer element 6 and after passing through the element 6 the current will flow from the terminal 39 back to the neutral wire 48 through the wire 40 and line 60.

Fig. 10 shows the switch 7 set to energize the inner element 5 only at 110 volts. In this setting the terminal 32 is connected to the terminal 37 by the line 62 and the terminal 33 is connected to the terminal 36 by the line 63. Current will then flow from the wire 46 through the line 63 and wire 45 to the terminal 44 of the inner element 5, and after passing through the element 5 the current will flow from the terminal 41 back to the neutral wire 48 through the wire 42 and the line 62.

Fig. 11 shows the switch 7 set to energize the inner and outer elements 5 and 6 in series at 110 volts. In this setting the terminal 34 is connected to the terminal 35 by the line 64, and the terminal 32 is connected to the terminal 37 by the line 65. Current will then flow from the wire 47 through the line 64 and wire 40 to the terminal 39 of the outer element 6 and then through the element 6, after which it flows from the terminal 43 of the element 6 through the wire 45 to the terminal 44 of the inner element 5. From the terminal 44 the current flows through the inner element 5 and from the terminal 41 back to the neutral line 48 through the wire 42 and line 65. In all the operative setting of the switch 7 the terminal 33 is connected to the terminal 38 by the line 66 so that the electric light bulb 25 will always be energized whenever the switch is set in an operative position.

Since the disc 16 is mounted on the switch operating stem 9 for rotation therewith and the switch operating stem 9 is rotated by the handle 13 to selectively set the switch in any desired position, the design simulating the various conditions of the heating unit are so arranged upon the disc 16 that the proper design will always be behind the window 22 at any selected setting of the switch. From this is will be seen that one can always tell at a glance the exact condition of the heating unit.

The connector 20 by which the disc 16 is removably mounted upon the switch operating stem 9 is formed from a single piece of spring steel. It comprises an upper leg 70 and a lower leg 71 which are connected together at the forward ends thereof by the looped portion 72 which extends above and below the leg 70 and 71. The rear end of the top leg is turned downwardly as indicated at 73; and the rear end 74 of the bottom leg is inclined upwardly and notched as indicated at 75. The legs 70 and 71 have V-shaped resilient tongues 76 and 77 struck outwardly therefrom and the front of the looped section 72 has an aperture 78 therethrough. The aperture 78 is the same diameter as the switch operating stem 9 and has a straight portion 79. The top of the looped section 72 is slotted at 80. In use the connector is first inserted into the aperture 18 in the disc 16 and then the connector is mounted upon the switch operating stem 9. The sides of the legs 70 and 71 engage the wall around the aperture 18 and the looped section 72 engages the front of the disc 16 above and below the aperture 18. The tongues 76 and 77 resiliently engage the rear face of the disc 16 within the aperture 18. In order to prevent turning of the disc 16 upon the connector 20 I provide three lugs 81, 82 and 83 which are integral with the front face of the disc 16 and extend outwardly therefrom. The lug 81 engages the connector in the notch 80 and the lugs 82 and 83 engage the sides of the lower part of the looped section 72. When in position upon the stem 9 the stem 9 extends through the aperture 78 with the straight portion 79 engaging the flattened section 11 of the stem. The down turned rear end 73 of the top leg 70 engages the flattened section 11 and the shoulder 84 of the stem 9, and the notch 75 of the upwardly inclined rear end 74 of the leg 71 straddles the under side of the stem 9. This construction and arrangement provides a very simple and efficient means for removably securing the disc 16 in a definite position upon the stem 9 for rotation therewith.

From the foregoing it will be apparent to those skilled in this art that I have provided a very simple and efficient means for accomplishing the objects of my invention.

It is to be understood that I am not limited to the specific construction shown and described herein as various modification may be made therein within the spirit of my invention.

What is claimed is:

1. An indicating and control mechanism for a cooking range electric heating unit having inner and outer heating elements said mechanism comprising, a rotary switch by which the energization of the heating elements is selectively controlled, a manually rotatable switch actuating stem by which said switch is set in selected positions, an indicator disc mounted upon said stem for rotation therewith, a plurality of different designs arranged in an annular row on said disc, each of said designs including two concentric colored rings which simulate the inner and outer heating elements of a heating unit, each design having a different combination of colors to simulate different degrees of energization of the inner and outer heating elements of a heating unit, a fixed index with which said designs are adapted to successively register as said stem is rotated, and each of said designs visually indicating which element or elements is energized and to what degree in accordance with the setting of said switch when a selected design is in register with said index.

2. An indicating and control mechanism for a cooking range electric heating unit having inner and outer heating elements said mechanism comprising, a rotary switch by which the energization of the inner and outer heating elements of a heating unit is selectively controlled disposed behind the front wall of a range, a manually rotatable switch actuating stem by which said switch is set in selected positions extending out through an aperture in the front wall of a range, an indicator disc mounted upon said stem for rotation therewith behind the front wall of a range, a plurality of different designs arranged in an annular row on said disc, said designs including colored rings of different diameters to simulate the inner and outer heating elements of a heating unit, a window in the front wall of a range with which said designs are adapted to successively register as said stem is rotated, and each of said designs visually indicating which element or elements is energized and to what degree in accordance with the setting of said switch when a selected design is in register with said window.

3. An indicating and control mechanism for a cooking range electric heating unit having inner and outer heating elements said mechanism comprising, a rotary switch by which the energization of the inner and outer heating elements of a heating unit is selectively controlled disposed behind the front wall of a range, a manually rotatable switch actuating stem by which said switch is set in selected positions extending out through an aperture in the front wall of a range, an indicator disc mounted upon said stem for rotation therewith behind the front wall of a range, a plurality of different designs arranged in an annular row on said disc, each of said designs including two concentric colored rings which simulate the inner and outer heating elements of a heating unit, each design having a different combination of colors to simulate different degrees of energization of the inner and outer heating elements of a heating unit, a window in the front wall of a range with which said designs are adapted to successively register as said stem is rotated, and each of said designs visually indicating which element or elements is energized and to what degree in accordance with the setting of said switch when a selected design is in register with said window.

4. An indicating and control mechanism for a cooking range electric heating unit having inner and outer heating elements said mechanism comprising, a rotary switch by which the energization of the heating elements is selectively controlled, a manually rotatable switch actuating stem by which said switch is set in selected positions, an indicator disc mounted upon said stem for rotation therewith, a plurality of different designs arranged in an annular row on said disc, said designs including colored rings of different diameters to simulate the inner and outer heating elements of a heating unit, a fixed index with which said designs are adapted to successively register as said stem is rotated, and each of said designs visually indicating which element or elements is energized and to what degree in accordance with the setting of said switch when a selected design is in register with said index.

ROBERT G. SHEIDLER.

(References on following page)

REFERENCES CITED

The following references are of record in the file of this patent:

UNITED STATES PATENTS

| Number | Name | Date |
|---|---|---|
| 2,081,827 | Lohe | May 25, 1937 |
| 2,438,760 | Marholz | Mar. 30, 1948 |
| 2,450,399 | Sheidler | Sept. 28, 1948 |
| 2,494,892 | Mayer | Jan. 17, 1950 |
| 2,494,904 | Scheidler | Jan. 17, 1950 |
| 2,507,093 | Collings | May 9, 1950 |
| 2,541,892 | Schulze | Feb. 13, 1951 |

OTHER REFERENCES

General Electric publication of 1941, "Ranges," page 7.